(12) United States Patent
Yang et al.

(10) Patent No.: US 10,298,538 B2
(45) Date of Patent: May 21, 2019

(54) ADDRESS RESOLUTION

(71) Applicant: HANGZHOU H3C TECHNOLOGIES CO., LTD., Zhejiang (CN)

(72) Inventors: Jun Yang, Beijing (CN); Xiaoqiang Tian, Beijing (CN); Hui Cao, Beijing (CN); Jun Zhao, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/518,050

(22) PCT Filed: Sep. 23, 2015

(86) PCT No.: PCT/CN2015/090340
§ 371 (c)(1),
(2) Date: Apr. 10, 2017

(87) PCT Pub. No.: WO2016/054974
PCT Pub. Date: Apr. 14, 2016

(65) Prior Publication Data
US 2017/0310635 A1    Oct. 26, 2017

(30) Foreign Application Priority Data
Oct. 9, 2014    (CN) .......................... 2014 1 0527542

(51) Int. Cl.
*H04L 12/46* (2006.01)
*H04L 29/08* (2006.01)
*H04L 29/12* (2006.01)

(52) U.S. Cl.
CPC ........ *H04L 61/103* (2013.01); *H04L 12/4633* (2013.01); *H04L 12/4666* (2013.01);
(Continued)

(58) Field of Classification Search
None
See application file for complete search history.

(56) References Cited

U.S. PATENT DOCUMENTS

2015/0124586 A1*  5/2015  Pani ................. H04L 12/18
                                              370/219
2015/0281067 A1* 10/2015  Wu ................. H04L 61/103
                                              370/392

FOREIGN PATENT DOCUMENTS

CN    102594943    7/2012
CN    103346900    10/2013
(Continued)

OTHER PUBLICATIONS

"ISO/IEC FCD 10589, Second Edition, IS-IS intra-domain routeing protocol", SC 6 (Seoul Meeting), May 23, 1998, Jun. 16, 1998 (revised), 134 pages.
(Continued)

*Primary Examiner* — Yaotang Wang
(74) *Attorney, Agent, or Firm* — Hewlett Packard Enterprise Patent Department

(57) ABSTRACT

In an example, a VTEP device may store first routing information acquired by the VTEP device, wherein the first routing information may be routing information of a host device connected with the VTEP device. The VTEP stores second routing information sent from other VTEP devices in a VXLAN, wherein the second routing information may be routing information of a host device connected with the other VTEP devices. The VTEP receives an address resolution request from a source host device, wherein the address resolution request comprises an IP address of a target host device, and a VXLAN identifier of a VXLAN to which the target host device belongs. and in response to a determination that routing information of the target host device may be stored locally, the VTEP sends an address resolution
(Continued)

response comprising a MAC address of the target host device to the source host device.

9 Claims, 4 Drawing Sheets

(52) U.S. Cl.
CPC .......... *H04L 67/10* (2013.01); *H04L 67/1097* (2013.01); *H04L 67/28* (2013.01); *H04L 61/6013* (2013.01); *H04L 61/6022* (2013.01)

(56) References Cited

FOREIGN PATENT DOCUMENTS

| CN | 103647853 | 3/2014 |
|----|-----------|--------|
| CN | 103814554 | 5/2014 |
| CN | 103841028 | 6/2014 |
| CN | 104283980 | 1/2015 |
| TW | 201014306 | 4/2010 |

OTHER PUBLICATIONS

Callon, R., "Use of OSI IS-IS for Routing in TCP/IP and Dual Environments", Network Working Group, Request for Comments: 1195, Dec. 1990, 60 pages.

International Search Report and Written Opinion dated Dec. 28, 2015, PCT Patent Application No. PCT/CN2015/090340 dated Sep. 23, 2015, 7 pages.

Mahalingam et al., "VXLAN: A Framework for Overlaying Virtualized Layer 2 Networks over Layer 3 Networks", Internet Engineering Task Force, Apr. 10, 2014, 23 pages.

Mahalingam et al., "Virtual extensible Local Area Network (VXLAN): A Framework for Overlaying Virtualized Layer 2 Networks over Layer 3 Networks", Request for Comments: 7348 Aug. 2014 19 pages.

\* cited by examiner a VTEP device may store first routing information acquired by the VTEP device, wherein the first routing information is routing information of a host device connected with the VTEP device — 101 the VTEP device may store second routing information sent from other VTEP devices in a VXLAN, wherein the second routing information is routing information of a host device connected with the other VTEP devices — 102 the VTEP device may receive an address resolution request from a source host device, wherein the address resolution request comprises an IP address of a target host device, and a VXLAN identifier of a VXLAN to which the target host device belongs — 103 in response to a determination according to the address resolution request that routing information of the target host device is stored locally in the VTEP device, the VTEP device may send an address resolution response comprising a MAC address of the target host device to the source host device, so that the source host device may sends a data packet to the target host device by using the MAC address of the target host device — 104

FIG. 1

```
401 +-+-+-+-+-+-+-+-+-+
    | Type= HOST-RI  |                              (1 byte)
    +-+-+-+-+-+-+-+-+-+
402 |      Length    |                              (1 byte)
    +-+-+-+-+-+-+-+-+-+-+-+-+-+
403 | Topology-Id/ Nickname |                       (2 bytes)
    +-+-+-+-+-+-+-+-+-+-+-+-+-+      407
404 |     Confidence    |           /               (1 byte)
405 +-+-+-+-+-+-+-+-+-+-+-+-+-+-+-+-+-+-+-+-+
406 |RSV|TAG| VLAN-ID/Bridge-Domain/VXLAN|          (4 bytes)
408 +-+-+-+-+-+-+-+-+-+-...-+-+-+-+-+-+
    |              IPv6 host              |        (16 bytes)
409 +-+-+-+-+-+-+-+-+-+-...-+-+-+-+-+-+
    |              MAC                    |        (6 bytes)
    +-+-+-+-+-+-+-+-...-+-+-+-+-+-+-+-+
    |     . . . . .    . . . . .   .   |
408 +-+-+-+-+-+-+-+-+-+-...-+-+-+-+-+-+
    |              IPv6 host              |        (16 bytes)
409 +-+-+-+-+-+-+-+-+-+-...-+-+-+-+-+-+
    |              MAC                    |        (6 bytes)
    +-+-+-+-+-+-+-+-...-+-+-+-+-+-+-+-+
```

FIG. 4

ADDRESS RESOLUTION

The application claims the benefit of Chinese Patent Application No. 201410527542.4, entitled "a method and apparatus for address resolution protocol pick-up", the content of which is incorporated herein in its entity by reference.

BACKGROUND

When a host device is to communicate with other devices in a layer 2 or layer 3 network, the communication can be implemented via a Virtual Extensible Local Area Network (VXLAN), and an address resolution may be performed during the communication.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

FIG. 1 is a schematic flowchart of a method for address resolution according to an example of the present disclosure;

FIG. 4 is a schematic structure diagram of a TLV unit according to an example of the present disclosure;

BRIEF DESCRIPTION OF THE DRAWINGS

Figure 2:
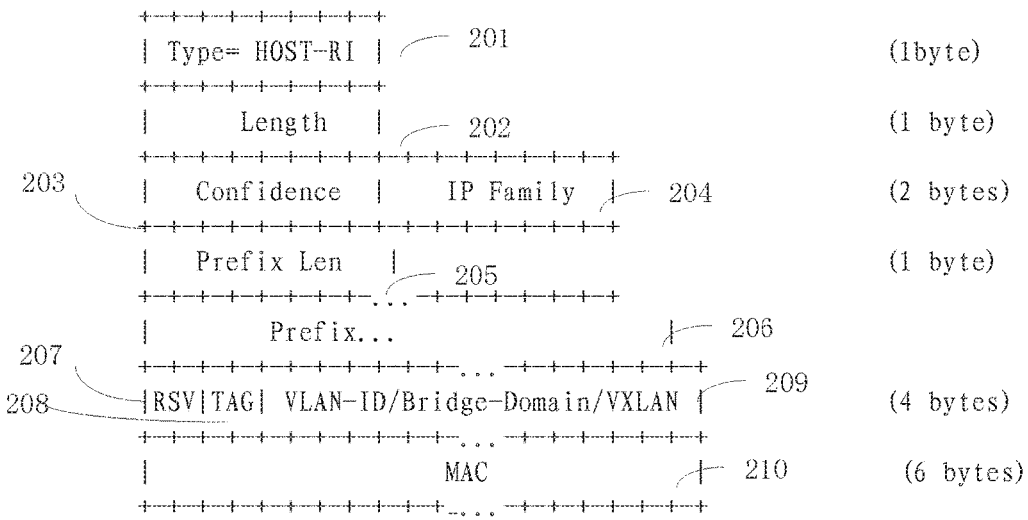
FIG. 2 is a schematic structure diagram of a Type-Length-Value (TLV) unit according to an example of the present disclosure.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

In a multi-user environment of cloud computing, each user may be assigned a logical network isolated with other logical networks. The isolation of the logical networks can be implemented by a VXLAN technique. The VXLAN technique may use a VXLAN ID to identify a VXLAN. In an example, the VXLAN ID may have 24 bits.

The VXLAN may be to establish a layer 2 network based on a layer 3 network. Therefore, the VXLAN may also be referred to as an overlay network. Layer 3 or layer 2 forwarding may be performed through a tunnel in the VXLAN.

Generally, the VXLAN may be deployed in a data central network, and a device running the VXLAN may be referred to as a VXLAN tunnel endpoint (VTEP) device, which may be responsible for encapsulation and decapsulation of packets in the VXLAN.

A downlink port of the VTEP device may be used for connecting to a server, and an uplink port of the VTEP device may be connected to a tunnel running the VXLAN. The VTEP devices may be interconnected with each other via tunnels. Many virtual machines are run within servers of the data central network. The VTEP devices are connected to a site network comprising a plurality of servers, and layer 2 communication may be performed between the virtual machines by using a virtual local area network (VLAN) protocol.

In an example of the present disclosure, a method for address resolution may be provided, which may be applied to a VTEP device in the VXLAN. The VTEP device may be a gateway device, or may be a border device.

FIG. 1 is a schematic flowchart of a method for address resolution according to an example of the present disclosure.

At block 101, a VTEP device may store first routing information acquired by the VTEP device, wherein the first routing information may be routing information of a host device connected with the VTEP device. The host device connected with the VTEP device may be referred as to the host device managed by the VTEP device.

At block 102, the VTEP device may store second routing information sent from other VTEP devices in a VXLAN, wherein the second routing information may be routing information of a host device connected with the other VTEP devices.

In an example, each of the first routing information and the second routing information may include an Internet Protocol (IP) address of the host device, a Media Access Control (MAC) address of the host device, and a VXLAN identifier of a VXLAN to which the host device belongs.

At block 103, the VTEP device may receive an address resolution request from a source host device, wherein the address resolution request comprises an IP address of a target host device, and a VXLAN identifier of a VXLAN to which the target host device belongs.

At block 104, in response to a determination according to the address resolution request that routing information of the target host device may be stored locally in the VTEP device, the VTEP device may send an address resolution response comprising a MAC address of the target host device to the source host device, so that the source host device may sends a data packet to the target host device by using the MAC address of the target host device.

Specifically, a VTEP device may acquire the routing information of a host device connected with the VTEP device, store the routing information locally and synchronize the routing information onto other VTEP devices in VXLANs.

Upon receiving the routing information of a host device connected with the other host device synchronized by the other VTEP devices, the VTEP device may store the routing information synchronized by the other VTEP devices.

Upon receiving the address resolution request including the IP address of a target host device and the VXLAN identifier of the VXLAN to which the target host device belongs from a source host device, the VTEP may determine whether the routing information of the source host device is stored locally.

If there are the same IP address and VXLAN identifier as the IP address of the target end and the VXLAN identifier of the VXLAN to which the target end belongs, it may be determined that routing information of the target host device is stored locally, and then the first VTEP device may send an address resolution response to the source host device, wherein the address resolution response comprises a MAC address corresponding to the same IP address and the VXLAN identifier. After responding to the address resolution request, the VTEP device may no longer broadcast the address resolution request via ports except the port via which the address resolution request may be received. Accordingly, the source host device may send a data packet to the target host device by using the MAC address carried by the address resolution response.

If it is determined that the routing information of the target host device is not stored locally, the address resolution request may be broadcasted via the ports except the port via which the address resolution request may be received. If a certain port via which the address resolution request is broadcasted is a tunnel port, the address resolution request may be sent after being encapsulated according to tunnel information corresponding to the tunnel port.

In an example of the present disclosure, there may be no specific requirement for the order of implementing 101, 102 and 103.

The host device of the present disclosure may be a device with its own IP address and MAC address, such as a Virtual machine (VM), a server, a Personal Computer (PC), and the like.

There are multiple manners for the VTEP device to acquire the routing information of the host device connected with the VTEP device. For example, the routing information may be acquired by a free ARP message, or may be acquired from information of a login request of the host device, or may be acquired from information of a request for indicating that the host device requests to access the network, etc.

In an example of the present disclosure, the address resolution request may be an Address Resolution Protocol (ARP) request message and the address resolution response may be an ARP response message.

In an example of the present disclosure, when determining that the first routing information changes, the VTEP device may update the first routing information stored locally and send the first routing information updated to the other VTEP devices.

In an example of the present disclosure, upon receiving the second routing information, the VTEP device may compare the second routing information sent from the other VTEP devices and second routing information previously stored in the VTEP device when the second routing information has been stored in the VTEP device previously; and in response to a determination that the second routing information previously stored in the VTEP device is inconsistent with the second routing information sent from the other VTEP devices, the VTEP device may record the second routing information sent from the other VTEP devices to replace the second routing information previously stored in the VTEP device.

In an example of the present disclosure, online of a host device caused by immigration of a VM or offline of a host device caused by emigration of a VM may lead to that the routing information of the host device connected with the VTEP device changes.

In an example of the present disclosure, the VTEP device may merely send the routing information of the host device connected with the VTEP device itself to the other VTEP devices and do not send the routing information received from the other VTEP devices to the other VTEP devices again.

In an example of the present disclosure, the routing information may be included in a Link State Protocol Data Unit (LSP) message to be sent to the other VTEP devices. Also, other messages may be used to send the routing information to the other VTEP devices.

In the realization process, if the LSP message is used to send the routing information, after the LSP message is received from the other VTEP devices, the routing information may be acquired from the LSP message and stored locally.

When it needs to send the routing information by the LSP message, an ISIS protocol may be enabled in each VTEP device to transmit the LSP message. When a certain VTEP device is a broader device, if there is no host device connected with the broader device, the ISIS protocol may not be enabled and the broader device may not send the routing information onto other gateway devices.

When the LSP message is used to carry the routing information, a new Type-Length-Value (TLV) unit may be set in the LSP message to carry the routing information.

For a better understanding, The TLV unit is described below in conjunction with FIGS. 2-4.

FIG. 2 illustrates a structure of a TLV unit which may carry the routing information of a host device with an IPV4 address or an IPV6 address.

The Type field 201 may represent that routing information of a host device (HOST-RI) may be carried by the unit and the value of the field may be 217.

The Length field 202 may represent the total length of the TLV unit.

The Confidence field 203 may be used for preference of a conflicted IP.

The IP Family field 204 may represent the type of the IP address carried by the TLV unit. For example, the IP Family field may represent that an IPV4 address may be carried by the TLV unit if the value of the field is 2, and may represent that an IPV6 address may be carried by the TLV unit if the value is of the field is 10.

The Prefix Len field 205 may represent the total length of all IP addresses carried by the TLV.

The Prefix field 206 may be used for carrying the IP address in the routing information.

The RSV field 207 may be a reserved field which may be filled with 0.

The Tag field 208 may represent what information is carried by a subsequent field. For example, the Tag field may represent that the subsequence field carries information of an ordinary VLAN network if the value of the tag field is 0, the subsequence field may carry information of a Bridge-Domain if the value of the Tag field is 1, and the subsequence field may carry information of a VXLAN if the value of the Tag field is 2. In an example of the present disclosure, the value of the TAG bit may be 2.

The VLAN-ID/Bridge-Domain/VXLAN field 209 may represent the VLAN\Bridge-Domain/VXLAN where a MAC address is located.

The MAC field 210 may be used for carrying information of the MAC address in the routing information.

The TLV in the present disclosure may have has other structures.

For example, the Type field may be used for indicating the type of the IP address, thus the information type of the host device may be judged from the Type field of the TLV, thereby omitting the IP Family field.

For example, the Type field may be used for indicating the type of the IP address; thus, the Prefix Len field may be omitted, as the length of IP addresses with a same type may be fixed and the Prefix Len may be useless for indicating the length of the IP address.

For example, in response to a determination that multiple host devices connected with the VTEP device have the same Type value, the same Confidence value, and the same VXLAN value, the routing information corresponding to the multiple host devices may be encapsulated into the same TLV unit, thus avoiding wasting the transmission resources. Regarding whether the routing information of different host devices is encapsulated in one TLV unit, the values of the three fields, the type field, the Confidence field and the VXLAN field, may be judged. Only the values of the three fields are same respectively, the routing information of the different host devices may be encapsulated into one TLV unit.

For example, an Topology-Id/Nickname field may be included for further expansion and each TLV unit may include an extensible filed which may be an Topology-Id/Nickname field.

Figure 3:
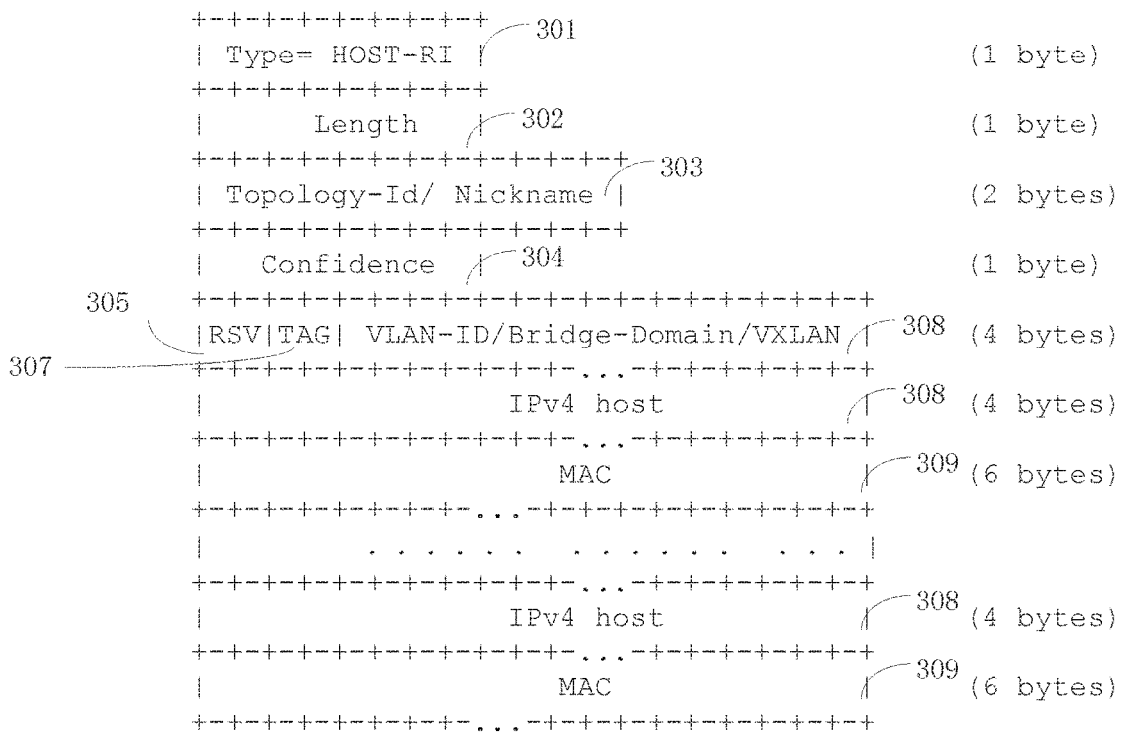
FIG. 3 is a schematic structure diagram of a TLV unit according to an example of the present disclosure.

Referring to FIG. 3, FIG. 3 illustrates structure of a TLV unit which may carry the routing information of a host device with an IPV4 address.

The Type field 301 may represent that the TLV unit carries the IPV4 address (ROUTE-RI) and the value of the field may be 218.

The Length field 302 may represent that the total length of the TLV and the total length may be "5+10*N", wherein the N represents the amount of the host devices whose routing information may be carried by the TLV unit.

The Topology-Id/Nickname 303 may be an extensible field and may be set to 0 to indicate that a subsequent MAC address can arrive via the source VTEP, thus a topology and Nickname need not to be distinguished, wherein one device may have more than one Nickname.

The Confidence field 304 may represent a confidence level and may be used for preference of a conflicted IP.

The RSV field 305 may be a reserved bit and may be filled with 0.

The Tag field 306 may represent what information may be carried by a subsequence field. For example, The Tag field may represent that an ordinary VLAN network may be carried by the subsequence field when the value of the Tag field is 0; the Tag field represents that information of a bridge-domain may be carried by the subsequence field when the value of the Tag field is 1; and the Tag field represents that information of a VXLAN may be carried by the subsequence field when the value of the TAG field is 2.

The VLAN-ID/Bridge-Domain/VXLAN field 307 may represent VXLAN, Bridge-Domain or VXLAN where a MAC address is located.

The IPv4 host field 308 may represent the IPv4 address of the host device.

The MAC field 309 may represent information of the MAC address.

Referring to FIG. 4, FIG. 4 illustrates structure of a TLV unit which may carry the routing information of a host device with an IPV6 address.

The Type field 401 may represent that the TLV unit carries the IPV6 address (ROUTE-RI), and the value of the Type field may be 219.

The Length field 402 may represent that the total length of the TLV and the total length may be "5+22*N", wherein the N may represent the amount of the host devices whose routing information may be carried by the TLV unit.

The Topology-Id/Nickname field 403 may be an extensible field and may be set to 0 to indicate that a subsequence MAC address can arrive via the source VTEP, thus a topology and Nickname need to be distinguished, wherein one device may have more than one Nickname.

The Confidence field 404 may represent a confidence level and may be used for preference of a conflicted IP.

The RSV field 405 may be a reserved bit and may be filled with 0.

The Tag field 406 may represent what information may be carried by a subsequence field. For example, The Tag field may represent that an ordinary VLAN network may be carried by the subsequence field when the value of the Tag field is 0; the Tag field may represent that information of a bridge-domain may be carried by the subsequence field when the value of the Tag field is 1; and the Tag field may represent that information of a VXLAN may be carried by the subsequence field when the value of the TAG field is 2.

The VLAN-ID/Bridge-Domain/VXLAN field 407 may represent VXLAN, Bridge-Domain or VXLAN where a MAC address is located.

The IPv6 host field 408 may represent the IPv6 address of the host device.

The MAC field 409 may represent information of the MAC address.

In the present disclosure, one TIN may carry the routing information of as many of host devices connected with the VTEP device. However, if the amount of the host devices with the VTEP device is too large, more than one TLV unit may be carried in the LSP message or another one LSP message may be generated to carry the routing information.

The description is given below, in conjunction with a specific networking, to describe how to implement the method for address resolution according to an example of the present disclosure.

Figure 5:
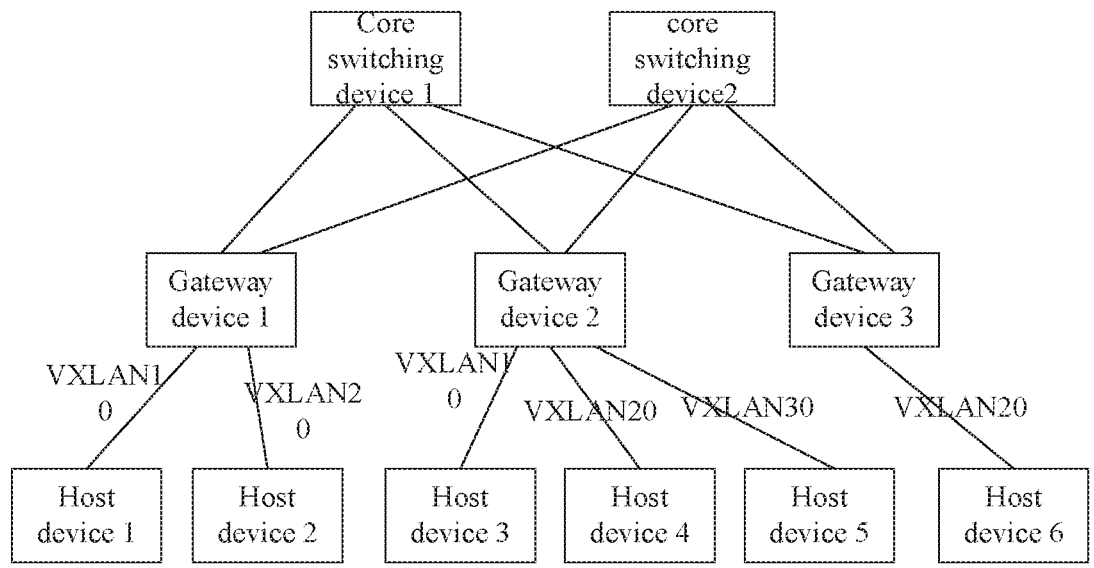
FIG. 5 is a schematic diagram of a VXLAN networking according to an example of the present disclosure.

FIG. 5 is a typical networking of VXLAN distributed gateway. In FIG. 5, it is assumed that the VTEP devices are gateway devices and the gateway devices acquire the routing information of the host devices connected with themselves.

Gateway device 1, gateway device 2 and gateway device 3 may be connected to core switching device 1 and switching device 2.

Gateway device 1, gateway device 2 and gateway device 3 may be interconnected with each other by tunnels, and an ISIS protocol may be run on the tunnels.

Host device 1 and host device 2 may be connected with gateway device 1, host device 3, host device 4 and host device 4 are connected with gateway device 2, and host device 6 may be connected with gateway device 3.

As each of host devices 1 to 6 comes online, the each host device may send a free ARP message.

Upon receiving the free ARP message from host device 1, gateway device 1 may acquire routing information of host device 1, which may include IP1, MAC 1 and VXLAN 10, wherein IP1 may be the IP address of the transmitting end of the free ARP message and the MAC 1 may be a source MAC address of the free ARP packet.

By the same implement manner, gateway device 1 may acquire routing information (i.e., IP2, MAC 2 and VXLAN 20) of host device 2 and gateway device 2 may acquire routing information (IP3, MAC 3 and VXLAN 20) of host device 3, routing information (IP4, MAC 4 and VXLAN 20) of host device 4 and routing information (IP5, MAC 5 and VXLAN 30) of host device 5, and gateway device 3 may acquire routing information (i.e., IP5, MAC 5 and VXLAN 30) of host device 6.

Gateway device 1 may store the routing information of host device 1 and host device 2 and send the routing information of host device 1 and host device 2 to gateway device 2 and gateway device 3 by carrying the routing information in a LSP message; gateway device 2 may store the routing information of host device 3, host device 4 and host device 5 and send the routing information of host device 3, host device 4 and host device 5 to gateway device 1 and gateway device 2 by carrying the routing information in a LSP message; and gateway device 3 may store the routing information of host device 6 and send the routing information of host device 6 to gateway device 1 and gateway device 2 by carrying the routing information in a LSP message;

Upon receiving the LSP message sent by gateway device 2, gateway device 1 may store locally the routing information of host device 3, host device 4 and host device 5 and identify that the routing information may be synchronized by gateway device 2; upon receiving the LSP message sent by gateway device 3, the gateway device may store locally the routing information of the host device 6, and identify that the routing information may be synchronized by the gateway device 3.

Gateway device 2 and gateway device 3 may store the routing information of all the host devices in the VXLANs, which may be the same as the above processing.

When host device 1 needs to send a data message to host device 3, and there may be no corresponding ARP entry stored locally, host device 1 may send an ARP request message to request the MAC address of host device 3.

Upon receiving the ARP request message, gateway device 1 may match the IP address (IP3) of the target end and the VXLAN identifier carried by the ARP request message with the routing information stored locally. If the IP address and the VXLAN identifier are matched with the corresponding information, gateway device 1 may send the MAC address in the corresponding routing information to host device 1, so that host device 1 sends the data message to host device 3.

When host device 3 connected with gateway device 2 is offline, gateway device 2 may determine that the routing information of the host devices connected with itself changes, namely that the routing information may be changed from the routing information of host device 3, host device 4 and host device 5 to routing information of host device 4 and host device 5. The changed routing information may be sent to gateway device 1 and gateway device 3 by being carried in the LSP message.

Upon receiving the LSP message, gateway device 1 and gateway device 3 may update the locally stored routing information corresponding to gateway device 2 respectively.

To sum up, in the various examples of the present disclosure, each VTEP device may acquire the routing information of the host devices connected under all other VTEP devices, thus when an address resolution request is received, the address resolution request needs not to be spread in a form of flooding across the entire network including different site layer 2 networks connected via the VXLAN, thus improving efficiency of address resolution and avoiding consuming much of entire network bandwidth of the data network.

Figure 6:
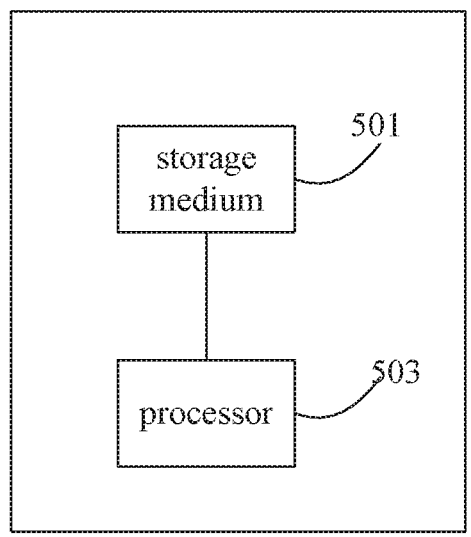
FIG. 6 is a schematic structure diagram of an device for address resolution according to an example of the present disclosure.

FIG. 6 illustrates a schematic structure diagram of a device for address resolution according to an example of the present disclosure.

As shown in FIG. 6, the device comprises a non-transitory storage medium 501 and processor 502. The non-transitory storage medium may for example be a memory, a hard disk, DVD, CD ROM or other storage medium. The non-transitory storage medium 501 may store machine readable instructions executable by the processor 502 to:

store first routing information acquired by the VTEP device, wherein the first routing information is routing information of a host device connected with the VTEP device;

store second routing information sent from other VTEP devices in a Virtual Extensible Local Area Network (VX-LAN), wherein the second routing information is routing information of a host device connected with the other VTEP devices;

wherein each of the first routing information and the second routing information comprises an Internet Protocol (IP) address of the host device, a Media Access Control (MAC) address of the host device, and a VXLAN identifier of a VXLAN to which the host device belongs;

receive an address resolution request from a source host device, wherein the address resolution request comprises an IP address of a target host device, and a VXLAN identifier of a VXLAN to which the target host device belongs; and in response to a determination according to the address resolution request that routing information of the target host device is stored locally in the VTEP device, send an address resolution response comprising a MAC address of the target host device to the source host device.

In an example of the present disclosure, wherein the instructions are further to:

generate a Date Link State Protocol Data Unit (LSP) message to include the first routing information; and send the LSP message to the other VTEP devices.

In an example of the present disclosure, wherein the instructions may be further to:

set a Type-Length-Value (TLV) unit in the LSP message for carrying the first routing information; and in response to a determination that multiple host devices connected with the VTEP device have the same Type value, the same Confidence value, and the same VXLAN value, encapsulating the first routing information corresponding to the multiple host devices into the same TLV unit.

In an example of the present disclosure, the LSP message may comprise an Type-Length-Value (TLV) unit for carrying the first routing information; and the TLV unit comprises: a Type field to represent a type of the IP address contained in the first routing information, or an extensible field.

In an example of the present disclosure, the instructions may be further to:

update the first routing information stored locally in the VTEP device when the first routing information changes; and send the first routing information updated to the other VTEP devices via an LSP message.

In an example of the present disclosure, the instructions may be further to:

update the first routing information stored locally in the VTEP device when the first routing information changes; and send the first routing information updated to the other VTEP devices via an LSP message.

In an example of the present disclosure, the instructions may be further to:

compare the second routing information sent from the other VTEP devices and second routing information previously stored in the VTEP device when the second routing information has been stored in the VTEP device; and in response to a determination that the second routing information previously stored in the VTEP device is inconsistent with the second routing information sent from the other VTEP devices, record the second routing information sent from the other VTEP devices to replace the second routing information previously stored in the VTEP device.

In an example of the present disclosure, a storage medium may be provided, which may comprise machine readable instructions executable by a processor to:

store first routing information acquired by the VTEP device, wherein the first routing information may be routing information of a host device connected with the VTEP device;

store second routing information sent from other VTEP devices in a Virtual Extensible Local Area Network (VX-LAN), wherein the second routing information may be routing information of a host device connected with the other VTEP devices;

wherein each of the first routing information and the second routing information comprises an Internet Protocol (IP) address of the host device, a Media Access Control (MAC) address of the host device, and a VXLAN identifier of a VXLAN to which the host device belongs;

receive an address resolution request from a source host device, wherein the address resolution request comprises an IP address of a target host device, and a VXLAN identifier of a VXLAN to which the target host device belongs; and in response to a determination according to the address resolution request that routing information of the target host device is stored locally in the VTEP device, send an address resolution response comprising a MAC address of the target host device to the source host device.

In an example of the present disclosure, the machine readable instructions may be further to:

generate a Date Link State Protocol Data Unit (LSP) message to include the first routing information; and send the LSP message to the other VTEP devices.

In an example of the present disclosure, the machine readable instructions may be further to:

set a Type-Length-Value (TLV) unit in the LSP message for carrying the first routing information; and in response to a determination that multiple host devices connected with the VTEP device have the same Type value, the same Confidence value, and the same VXLAN value, encapsulating the first routing information corresponding to the multiple host devices into the same TLV unit.

In an example of the present disclosure, the LSP message may comprise an Type-Length-Value (TLV) unit for carrying the first routing information; and the TLV unit may comprise: a Type field to represent a type of the IP address contained in the first routing information, or an extensible field.

In an example of the present disclosure, the machine readable instructions may be further to:

update the first routing information stored locally in the VTEP device when the first routing information changes; and send the first routing information updated to the other VTEP devices via an LSP message.

In an example of the present disclosure, the machine readable instructions may be further to:

compare the second routing information sent from the other VTEP devices and second routing information previously stored in the VTEP device when the second routing information has been stored in the VTEP device; and in response to a determination that the second routing information previously stored in the VTEP device is inconsistent with the second routing information sent from the other VTEP devices, record the second routing information sent from the other VTEP devices to replace the second routing information previously stored in the VTEP device.

To sum up, in the various examples of the present disclosure, each VTEP device may acquire the routing information of the host devices connected under all other VTEP devices, thus when an address resolution request is received, the address resolution request needs not to be spread in a form of flooding across the entire network including different site layer 2 networks connected via the VXLAN, thus improving efficiency of address resolution and avoiding consuming much of entire network bandwidth of the data network.

It should be noted that, the examples of the present disclosure are described progressively. For each example, difference of the example with respect to other examples is described in emphasis. Detailed description of other parts of the example may be seen from other examples. For the apparatus examples, detailed actions may be seen from corresponding method examples.

Those with ordinary skill in the art know that all or some of the blocks of the present disclosure may be implemented by hardware, or implemented by a program executed on a relevant hardware. The program may be stored on a computer readable storage medium.

What has been described and illustrated herein is a preferred example of the present disclosure along with some of its variations. Many variations are possible within the scope of the present disclosure, which is intended to be defined by the following claims and their equivalent in which all terms are meant in their broadest reasonable sense unless otherwise indicated.

What is claimed is:

1. A method for address resolution, comprising:

storing, by a Virtual Extensible Local Area Network End Point (VTEP) device, first routing information acquired by the VTEP device, wherein the first routing information is routing information of a host device connected with the VTEP device;

storing, by the VTEP device, second routing information sent from other VTEP devices in a Virtual Extensible Local Area Network (VXLAN), wherein the second routing information is routing information of a host device connected with the other VTEP devices;

wherein each of the first routing information and the second routing information comprises an Internet Protocol (IP) address of the host device, a Media Access Control (MAC) address of the host device, and a VXLAN identifier of a VXLAN to which the host device belongs;

generating, by the VTEP device, a Date Link State Protocol Data Unit (LSP) message to comprise the first routing information;

setting a Type-Length-Value (TLV) unit in the LSP message for carrying the first routing information;

in response to a determination that multiple host devices connected with the VTEP device have the same Type value, the same Confidence value, and the same VXLAN value, encapsulating the first routing information corresponding to the multiple host devices in the same TLV unit;

sending by the VTEP device, the LSP message to the other VTEP devices;

receiving, by the VTEP device, an address resolution request from a source host device, wherein the address resolution request comprises an IP address of a target host device, and a VXLAN identifier of a VXLAN to which the target host device belongs; and in response to a determination according to the address resolution request that routing information of the target host device is stored locally in the VTEP device, sending, by the VTEP device, an address resolution response comprising a MAC address of the target host device to the source host device.

2. The method according to claim 1, wherein
the TLV unit comprises: a Type field to represent a type of the IP address contained in the first routing information.

3. The method according to claim 1, further comprising:
updating, by the VTEP device, the first routing information stored locally in the VTEP device when the first routing information changes; and
sending, by the VTEP device, the first routing information updated to the other VTEP devices via an LSP message.

4. The method according to claim 1, wherein storing the second routing information sent from the other VTEP devices comprises:
comparing the second routing information sent from the other VTEP devices and second routing information previously stored in the VTEP device when the second routing information has been stored in the VTEP device; and
in response to a determination that the second routing information previously stored in the VTEP device is inconsistent with the second routing information sent from the other VTEP devices, recording the second routing information sent from the other VTEP devices to replace the second routing information previously stored in the VTEP device.

5. A device for address resolution, comprising a non-transitory storage medium and a processor, wherein the non-transitory storage medium stores machine readable instructions executable by the processor to:
store first routing information acquired by a Virtual Extensible Local Area Network End Point (VTEP) device, wherein the first routing information is routing information of a host device connected with the VTEP device;
store second routing information sent from other VTEP devices in a Virtual Extensible Local Area Network (VXLAN), wherein the second routing information is routing information of a host device connected with the other VTEP devices;
wherein each of the first routing information and the second routing information comprises an Internet Protocol (IP) address of the host device, a Media Access Control (MAC) address of the host device, and a VXLAN identifier of a VXLAN to which the host device belongs;
generate a Date link State Protocol Data Unit (LSP message to comprise the first routing information;
set a Type-Length-Value (TLV) unit in the LSP message for carrying the first routing information;
in response to a determination that multiple host devices connected with the VTEP device have the same Type value, the same Confidence value, and the same VXLAN value, encapsulate the first routing information corresponding to the multiple host devices into the same TLV unit;
send the LSP message to the other VTEP devices;
receive an address resolution request from a source host device, wherein the address resolution request comprises an IP address of a target host device, and a VXLAN identifier of a VXLAN to which the target host device belongs; and in response to a determination according to the address resolution request that routing information of the target host device is stored locally in the VTEP device, send an address resolution response comprising a MAC address of the target host device to the source host device.

6. The device according to claim 5, wherein
the TLV unit comprises: a Type field to represent a type of the IP address contained in the first routing information.

7. The device according to claim 5, wherein the instructions are further to:
update the first routing information stored locally in the VTEP device when the first routing information changes; and
send the first routing information updated to the other VTEP devices via an LSP message.

8. A non-transitory storage medium storing machine readable instructions executable by a processor to:
store first routing information acquired by a Virtual Extensible Local Area Network End Point (VTEP) device, wherein the first routing information is routing information of a host device connected with the VTEP device;
store second routing information sent from other VTEP devices in a Virtual Extensible Local Area Network (VXLAN), wherein the second routing information is routing information of a host device connected with the other VTEP devices;
wherein each of the first routing information and the second routing information comprises an Internet Protocol (IP) address of the host device, a Media Access Control (MAC) address of the host device, and a VXLAN identifier of a VXLAN to which the host device belongs;
generate a Date Link State Protocol Data Unit (LSP) message to comprise the first routing information;
set a Type-Length-Value (TLV) unit in the LSP message for carrying the first routing information;
in response to a determination that multiple host devices connected with the VTEP device have the same Type value, the same Confidence value, and the same VXLAN value, encapsulating the first routing information corresponding to the multiple host devices into the same TLV unit;
send the LSP message to the other VTEP devices;
receive an address resolution request from a source host device, wherein the address resolution request comprises an IP address of a target host device, and a VXLAN identifier of a VXLAN to which the target host device belongs; and
in response to a determination according to the address resolution request that routing information of the target host device is stored locally in the VTEP device, send an address resolution response comprising a MAC address of the target host device to the source host device.

9. The non-transitory storage medium according to claim 8, wherein
the TLV unit comprises: a Type field to represent a type of the IP address contained in the first routing information.

* * * * *